United States Patent
Sun et al.

(10) Patent No.: US 9,309,797 B2
(45) Date of Patent: Apr. 12, 2016

(54) SYSTEM AND METHOD FOR CONTROLLING DOSING IN SELECTIVE CATALYTIC REDUCTION CATALYST

(71) Applicant: GM GLOBAL TECHNOLOGY OPERATIONS LLC, Detroit, MI (US)

(72) Inventors: Min Sun, Troy, MI (US); Justin Adam Shetney, Livonia, MI (US); Amr Radwan, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/197,954

(22) Filed: Mar. 5, 2014

(65) Prior Publication Data
US 2015/0252709 A1 Sep. 10, 2015

(51) Int. Cl.
*F01N 3/00* (2006.01)
*F01N 3/20* (2006.01)

(52) U.S. Cl.
CPC .................................... *F01N 3/208* (2013.01)

(58) Field of Classification Search
CPC ..... F02D 41/029; F01N 9/002; F01N 3/0842; F01N 3/035; F01N 13/002
USPC ........................................... 60/295, 297, 301
See application file for complete search history.

(56) References Cited

U.S. PATENT DOCUMENTS

| | | | |
|---|---|---|---|
| 2008/0216463 A1* | 9/2008 | Chaineux et al. | 60/274 |
| 2009/0049828 A1* | 2/2009 | Wei et al. | 60/295 |
| 2010/0107606 A1* | 5/2010 | Narayanaswamy et al. | 60/274 |
| 2010/0326052 A1* | 12/2010 | Sun | 60/274 |
| 2011/0023591 A1* | 2/2011 | Dobson et al. | 73/114.75 |
| 2011/0041480 A1* | 2/2011 | Yasui et al. | 60/286 |
| 2012/0216509 A1* | 8/2012 | Sujan et al. | 60/274 |
| 2012/0310507 A1* | 12/2012 | Auckenthaler | 701/102 |
| 2012/0311998 A1* | 12/2012 | Sun et al. | 60/285 |
| 2013/0239552 A1* | 9/2013 | Gonze et al. | 60/276 |
| 2013/0311065 A1* | 11/2013 | Sun et al. | 701/104 |

FOREIGN PATENT DOCUMENTS

WO   WO 2004092555 A1 * 10/2004 ............. F01N 11/00

OTHER PUBLICATIONS

Machine Translation of WO 2004092555, Translated on Jan. 28, 2015.*

* cited by examiner

*Primary Examiner* — Patrick Maines
(74) *Attorney, Agent, or Firm* — Quinn Law Group, PLLC

(57) ABSTRACT

An engine assembly includes an exhaust system having a first SCR catalyst, a second SCR catalyst in fluid communication with the first SCR catalyst, and an injector configured to inject reductant into the exhaust system. A controller is configured to estimate a first amount of ammonia stored in the first SCR catalyst and to estimate a second amount of ammonia stored in the second SCR catalyst. The controller is operatively connected to the injector and configured to control the amount of reductant injected by the injector. The controller controls the injector based on the first amount, the second amount, and a temperature of a substrate disposed in the second SCR catalyst.

12 Claims, 2 Drawing Sheets

SYSTEM AND METHOD FOR CONTROLLING DOSING IN SELECTIVE CATALYTIC REDUCTION CATALYST

TECHNICAL FIELD

This invention relates to vehicle exhaust systems having selective catalytic reduction catalysts.

BACKGROUND

Selective catalytic reduction (SCR) of oxides of nitrogen ($NO_x$) by nitrogen compounds, such as ammonia or urea, can be incorporated into mobile diesel internal combustion engines such as heavy-duty truck and bus engines. Generally, in the ammonia-SCR process, an aqueous water solution of urea is injected into the exhaust gas stream of an engine. At temperatures above 160° C., the urea begins to undergo hydrolysis and thermal decomposition resulting in the production of ammonia. The resulting mixture including urea/ammonia and exhaust gases then passes to an SCR catalyst such as platinum (Pt), vanadium, or zeolite, where the ammonia reacts with $NO_x$ gases to form nitrogen gas and water.

SUMMARY

An engine assembly includes an exhaust system having a first SCR catalyst, a second SCR catalyst in fluid communication with the first SCR catalyst, and an injector configured to inject reductant into the exhaust system. A controller is configured to estimate a first amount of ammonia stored in the first SCR catalyst and to estimate a second amount of ammonia stored in the second SCR catalyst. The controller is operatively connected to the injector and configured to control the amount of reductant injected by the injector. The controller controls the injector based on the first amount, the second amount, and a temperature of a substrate disposed in the second SCR catalyst.

A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
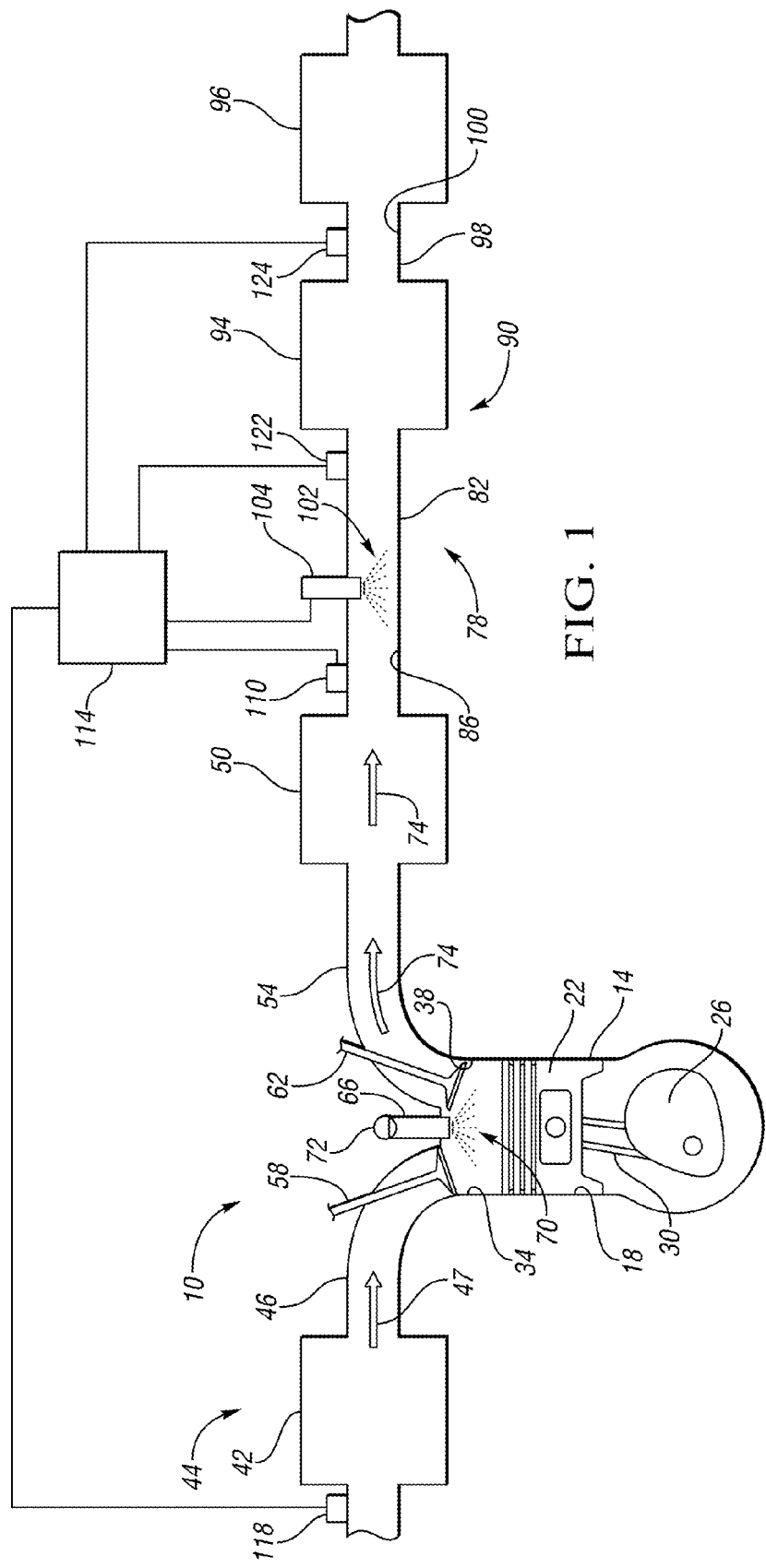
FIG. 1 is a functional block diagram of an example engine system according to the principles of the present disclosure.

Referring to FIG. 1, a compression-ignition engine 10 is schematically depicted. The engine 10 includes an engine block 14 defining a plurality of cylinders, only one of which is shown at 18. The engine 10 further includes a plurality of pistons, only one of which is shown at 22. Each piston 22 is positioned within a respective one of the cylinders 18 for reciprocal translation therein between a top dead center position and a bottom dead center position, as understood by those skilled in the art.

Each piston 22 is operatively connected to a crankshaft 26 via a respective connecting rod 30 such that the reciprocal translation of each piston 22 causes rotation of the crankshaft 26 and vice versa. Each cylinder 18 includes a respective intake port 34 and a respective exhaust port 38 formed by a cylinder head. Each intake port 34 is in selective fluid communication with an intake plenum or manifold 42 of an air intake system 44 via a respective runner 46 to receive an intake charge including air 47 and, optionally, recirculated exhaust gas (EGR). Each exhaust port 38 is in selective fluid communication with an exhaust manifold 50 via a respective runner 54, as understood by those skilled in the art.

Each cylinder 18 has a respective intake valve 58 associated therewith. Each intake valve 58 is movable between an open position in which the cylinder 18 associated with the intake valve 58 is in fluid communication with the plenum 42 via its respective intake port 34, and a closed position in which the intake valve 58 obstructs a respective one of the intake ports 34 thereby to prevent fluid communication between the cylinder 18 associated with the intake valve and the plenum 42.

Similarly, each cylinder 18 has a respective exhaust valve 62 associated therewith. Each exhaust valve 62 is movable between an open position in which the cylinder associated with the exhaust valve is in fluid communication with the exhaust manifold 50 via its respective exhaust port 38, and a closed position in which the exhaust valve 62 obstructs a respective one of the exhaust ports 38 thereby to prevent fluid communication between the cylinder 18 associated with the exhaust valve and the exhaust manifold 50.

As understood by those skilled in the art, a fuel injector 66 is configured to inject fuel 70 into the cylinder 18 for combustion therein. The fuel injector 66 is in fluid communication with a fuel rail 72 that contains pressurized fuel 70. The products of combustion, i.e., exhaust gas 74, are expelled from the cylinder 18 through the exhaust port 38 during the exhaust stroke of the piston 22. The exhaust gas 74 is transmitted by the runner 54 to the exhaust manifold 50.

During an intake stroke, the intake valve 58 is open, and the piston 22 moves from its top dead center position to its bottom dead center position, thereby drawing air 47 into the cylinder 18 through the intake port 34. During a subsequent compression stroke, the piston 22 moves from its bottom dead center position to its top dead center position, thereby compressing the air 47 (intake and exhaust valves 58, 62 are closed during the compression stroke). The fuel injector 66 injects the fuel 70 into the cylinder 18 when the piston 22 is at or near top dead center, generating pressure and forcing the piston 22 to its bottom dead center position during an expansion stroke. After the expansion stroke, the piston 22 returns to its top dead center position during an exhaust stroke, thereby forcing the exhaust gases 74 out of the cylinder 18 through the exhaust port 38 past the opened exhaust valve 62.

The manifold 50 is part of an exhaust system 78 configured to convey the exhaust gas 74 from the engine 10 and to modify the chemical composition of the exhaust gas 74. The exhaust system 78 includes an exhaust conduit 82 that defines a passage 86. The exhaust system 78 further includes a selective catalytic reduction (SCR) system 90, which includes a first SCR catalyst 94 and a second SCR catalyst 96. Passage 86 provides fluid communication between the manifold 50 and the first SCR catalyst 94 such that the conduit 82 conveys exhaust gas 74 from the engine 10 to the SCR catalyst 94. Conduit 98 defines a passage 100 that provides fluid communication between the first SCR catalyst 94 and the second catalyst 96.

It should be noted that the engine 10 may include a two-way catalyst (not shown) between the exhaust manifold 50 and the first SCR catalyst 94. In the embodiment depicted, the first catalyst 94 is a selective catalytic reduction filter (SCRF), i.e., a particulate filter with an SCR coating.

The SCR system 90 includes a tank (not shown) for storing a reductant 102, such as urea. A reductant injector 104 is configured to inject reductant 102 from the tank into the passageway 86 upstream of the first SCR catalyst 94. A pump (not shown) may be employed to transmit reductant 102 from the tank to the injector 104. The reductant 102 is employed to convert oxides of nitrogen ($NO_x$) in the exhaust gas 74 into diatomic nitrogen and water.

A $NO_x$ sensor 110 is configured to determine the amount of $NO_x$ (oxides of nitrogen) in the exhaust gas 74, e.g., in parts per million. An electronic controller 114, namely the engine control unit (ECU), is operatively connected to the injector 104 for controlling the amount of reductant 102 that is injected by the injector 104. The $NO_x$ sensor 110 is operatively connected to the electronic controller 114 to transmit thereto signals indicative of the amount of $NO_x$ in the exhaust 74.

The mass flow rate of air flowing into the intake manifold 42 is measured using a mass air flow (MAF) sensor 118, which is operatively connected to the controller 114 to communicate the mass air flow rate thereto. A first exhaust gas temperature sensor 122 is disposed at or near the inlet of the first SCR catalyst 94, e.g., in the passageway 86. A second exhaust gas temperature sensor 124 is disposed at or near the inlet of the second SCR catalyst 96, e.g., in the passageway 100.

The temperature of a selective catalytic reduction (SCR) catalyst affects the efficiency of reactions within the SCR catalyst that reduce nitrogen oxide and affects the ability of the SCR catalyst to store ammonia. When the temperature of an SCR catalyst is low, such as less than 144 degrees Celsius (° C.), the efficiency of reactions that reduce nitrogen oxide within the SCR catalyst approaches zero. Thus, even if the SCR catalyst contains ammonia, the ammonia does not react with and reduce nitrogen oxide. When the temperature of an SCR catalyst is high, such as greater than 400° C., the SCR catalyst is unable to store ammonia.

The temperature of the SCR catalyst is affected by the distance between the engine and the SCR catalyst. The distance between the engine and an SCR catalyst that is disposed immediately downstream from a two-way catalyst may be relatively short. Therefore, the temperature of the SCR catalyst may be too low to effectively reduce nitrogen oxide only when the engine is initially started.

The controller 114 is configured to perform a method in which the controller estimates a first amount of ammonia stored in the first SCR catalyst 94 and a second amount of ammonia stored in the second SCR catalyst 96. The second SCR catalyst 96 is disposed downstream from the first SCR catalyst 94. The first and second amounts may be estimated based on the temperature of exhaust gas flowing through the SCR catalysts 94, 96. A multiplier is determined based on the temperature of the second SCR catalyst 96. An effective amount of ammonia stored in the SCR catalysts is estimated based on a sum of the first amount and a product of the multiplier and the second amount. The effective amount represents the amount of ammonia that is effectively reducing nitrogen oxide in the SCR system 90.

Estimating the amount of ammonia stored in the SCR catalysts based on the temperature of exhaust gas flowing through the SCR catalysts accounts for declines in the ability of the SCR catalysts to store ammonia at high temperatures. Estimating the effective amount of ammonia stored in the SCR catalysts using the multiplier accounts for reductions in the reaction efficiency of the second SCR catalyst at low temperatures. If more than one SCR catalyst is disposed downstream from another SCR catalyst, a multiplier may be applied to the estimated amount of ammonia stored in each SCR catalyst that is disposed downstream from another SCR catalyst The controller 114 uses the effective amount of ammonia to control the injector 104; that is, if the effective amount of ammonia is too low, i.e., below a predetermined amount, then the controller 114 causes the injector 104 to inject additional reductant 102 into the exhaust system 78 upstream of the first and second SCR catalysts 94, 96. If the effective amount of ammonia is sufficiently high, then the controller 114 does not cause the injector 104 to inject additional reductant into the exhaust system 78.

Figure 2:
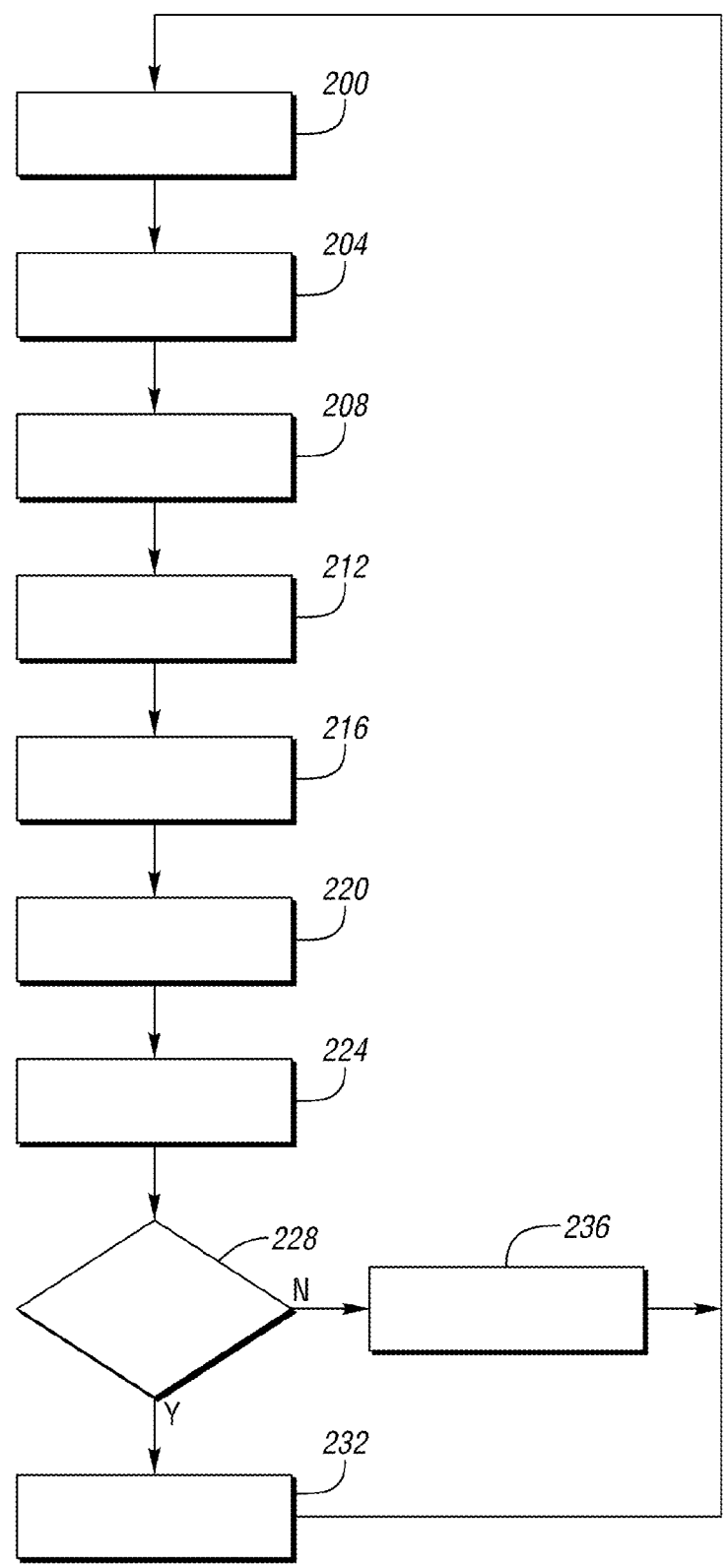
FIG. 2 is a flowchart illustrating an example control method according to the principles of the present disclosure.

FIG. 2 is a flow chart depicting the method employed by the controller 114. Referring to FIGS. 1 and 2, at step 200 the controller 114 determines a mass flow rate of exhaust gas 74 from the engine 10 through the exhaust system 78. The controller 114 determines a mass flow rate of exhaust gas 74 from the engine 10 based on a mass flow rate of air entering the engine 10 and a fueling rate of the engine 10. The controller 114 may receive the mass flow rate of air from the MAF sensor 118. The controller 114 may receive the fueling rate from a fuel meter that determines mass flow rate of fuel through the fuel rail 72. The mass flow rate of exhaust gas 74 may be based on a sum of a mass flow rate of air entering the engine and a fueling rate of the engine.

At step 204, the controller 114 determines nitrogen oxide levels in the exhaust gas 74. The controller 114 may determine the nitrogen oxide level based on input from the NOx sensor 110. At step 208, the controller 114 estimates a first amount of ammonia stored in the first SCR catalyst 94. The controller 114 may estimate the first amount based on the mass flow rate of exhaust gas (determined at step 200), the nitrogen oxide levels (determined at step 204), and the temperature of exhaust gas 74 entering the first SCR catalyst 94. The temperature of exhaust gas 74 entering the first SCR catalyst 94 may be measured (e.g., by sensor 122) or estimated.

At step 212, the controller 114 estimates a second amount of ammonia stored in the second SCR catalyst 96. The controller 114 may estimate the second amount based on the mass flow rate of exhaust gas (determined at step 200), the nitrogen oxide levels (determined at step 204), and the temperature of exhaust gas entering the second SCR catalyst 96. The temperature of exhaust gas entering the second SCR catalyst may be measured, e.g., by sensor 124, or estimated. The controller 114 may also estimate the nitrogen oxide and ammonia levels in exhaust gas exiting the first SCR catalyst 94 and use those values in determining the second amount of ammonia stored in the second SCR catalyst 96.

At step 216, the controller 114 estimates the temperature of a substrate disposed in the second SCR catalyst 96. The controller 114 may estimate the substrate temperature based on the temperature of exhaust gas entering the second SCR catalyst 96 (measured by sensor 124) and the mass flow rate of exhaust gas 74. The controller 114 may increase the rate at which the substrate temperature is adjusted in response to a change in the temperature of exhaust gas 74 when the mass flow rate of exhaust gas increases.

At step 220, the controller 114 determines a multiplier based on the substrate temperature. The controller 114 may set the multiplier equal to zero when the substrate temperature is less than a first temperature (e.g., 150° C.). The controller 114 may set the multiplier equal to one when the substrate temperature is greater than a second temperature (e.g., 200° C.). The first and second temperatures may be predetermined. The controller 114 may adjust the multiplier in a linear or nonlinear manner as the substrate temperature transitions between the first temperature and the second temperature.

At step 224, the controller 114 estimates an effective amount of ammonia stored in the first catalyst 94 and the second catalyst 96. The effective amount represents the amount of ammonia stored in the first and second SCR catalysts 94, 96 that effectively reduces nitrogen oxide. The controller 114 may determine a product of the multiplier and the second amount, and then set the effective amount equal to a sum of the first amount and the product.

At step 228, the controller 114 inquires whether the effective amount is greater than a predetermined amount. If the effective amount is greater than a predetermined amount, the controller proceeds to step 232. At step 232, the controller 114 does not cause the injector 104 to inject reductant into the exhaust system 78, and/or causes the injector 104 to cease injecting reductant 102. If the effective amount is less than the predetermined amount, the controller 114 proceeds to step 236. At step 236, the controller causes the injector 104 to inject reductant 102 into the exhaust system 78.

While the best modes for carrying out the invention have been described in detail, those familiar with the art to which this invention relates will recognize various alternative designs and embodiments for practicing the invention within the scope of the appended claims.

The invention claimed is:

1. An engine assembly comprising:
an exhaust system having a first SCR catalyst, a second SCR catalyst in fluid communication with the first SCR catalyst, and an injector in fluid communication with a reductant and configured to inject a reductant into the exhaust system; and
a controller configured to estimate a first amount of ammonia stored in the first SCR catalyst and to estimate a second amount of ammonia stored in the second SCR catalyst;
wherein the controller is configured to determine a multiplier based on a temperature of a substrate disposed in the second SCR catalyst;
wherein the controller is operatively connected to the injector and configured to control injection of the reductant by the injector based on an effective amount of ammonia stored in the first and second SCR catalysts;
wherein the controller is configured to determine the effective amount of ammonia stored in the first and second SCR catalysts based on a sum of the first amount of ammonia and a product of the multiplier and the second amount of ammonia; and
wherein the controller is configured to send a control signal to the injector to inject reductant into the exhaust system when the effective amount of ammonia is below a predetermined amount, and to not send a control signal, thereby not causing the injector to inject reductant into the exhaust system, when the effective amount of ammonia is greater than the predetermined amount.

2. The engine assembly of claim 1, wherein the controller estimates the first amount of ammonia based on a temperature of exhaust gas entering the first SCR catalyst and a mass flow rate of exhaust gas flowing through the first SCR catalyst.

3. The engine assembly of claim 1, wherein the controller estimates the second amount of ammonia based on a temperature of exhaust gas entering the second SCR catalyst and a mass flow rate of exhaust gas flowing through the second SCR catalyst.

4. The engine assembly of claim 1, wherein the controller estimates the first amount of ammonia and the second amount of ammonia based on input received from a nitrogen oxide sensor disposed upstream from the first SCR catalyst.

5. The engine assembly of claim 1, wherein the multiplier is equal to zero when the temperature of the substrate is less than a first temperature and the multiplier is equal to one when the temperature of the substrate is greater than a second temperature.

6. The engine assembly of claim 5, wherein the first temperature is 144 degrees Celsius and the second temperature is 200 degrees Celsius.

7. A method of controlling an engine assembly comprising an exhaust system and a controller, the method comprising:
estimating, via a controller, a first amount of ammonia stored in a first selective catalytic reduction (SCR) catalyst;
estimating, via the controller, a second amount of ammonia stored in a second SCR catalyst;
wherein the exhaust system comprises the first SCR catalyst, the second SCR catalyst in fluid communication with the first SCR catalyst, and an injector in fluid communication with a reductant and configured to inject a reductant into the exhaust system;
determining, via the controller, a multiplier based on a temperature of a substrate disposed in the second SCR catalyst;
controlling injection of the reductant by the injector, via the controller being operatively connected to the injector, based on an effective amount of ammonia stored in the first and second SCR catalysts;
determining, via the controller, the effective amount of ammonia stored in the first and second SCR catalysts based on a sum of the first amount of ammonia and a product of the multiplier and the second amount of ammonia; and
sending, via the controller, a control signal to the injector to inject reductant into the exhaust system when the effective amount of ammonia is below a predetermined amount, and not sending a control signal, thereby not causing the injector to inject reductant into the exhaust system, when the effective amount of ammonia is greater than the predetermined amount.

8. The method of claim 7, further comprising estimating the first amount of ammonia based on a temperature of exhaust gas entering the first SCR catalyst and a mass flow rate of exhaust gas flowing through the first SCR catalyst.

9. The method of claim 7, further comprising estimating the second amount of ammonia based on a temperature of exhaust gas entering the second SCR catalyst and a mass flow rate of exhaust gas flowing through the second SCR catalyst.

10. The method of claim 7, further comprising estimating the first amount of ammonia and the second amount of ammonia based on input received from a nitrogen oxide sensor disposed upstream from the first SCR catalyst.

11. The method of claim 7, wherein the multiplier is equal to zero when the temperature of the substrate is less than a first temperature and the multiplier is equal to one when the temperature of the substrate is greater than a second temperature.

12. The method of claim 11, wherein the first temperature is 144 degrees Celsius and the second temperature is 200 degrees Celsius.

* * * * *